(12) United States Patent
Erhard

(10) Patent No.: US 11,988,909 B2
(45) Date of Patent: May 21, 2024

(54) FARADAY ROTATORS, OPTICAL ISOLATORS, DRIVER LASER ARRANGEMENTS AND EUV RADIATION GENERATION APPARATUS

(71) Applicant: TRUMPF Lasersystems for Semiconductor Manufacturing GmbH, Ditzingen (DE)

(72) Inventor: Steffen Erhard, Korntal-Muenchingen (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 947 days.

(21) Appl. No.: 16/996,238

(22) Filed: Aug. 18, 2020

(65) Prior Publication Data
US 2020/0379281 A1 Dec. 3, 2020

Related U.S. Application Data

(63) Continuation of application No. PCT/EP2018/054005, filed on Feb. 19, 2018.

(51) Int. Cl.
*G02F 1/09* (2006.01)
*G02B 1/12* (2006.01)

(52) U.S. Cl.
CPC .............. *G02F 1/093* (2013.01); *G02F 1/091* (2013.01); *G02B 1/12* (2013.01)

(58) Field of Classification Search
CPC .................................. G02F 1/091; G02F 1/093
(Continued)

(56) References Cited

U.S. PATENT DOCUMENTS 3,781,714 A * 12/1973 Schlossberg ............ G02F 1/093
359/484.04
4,686,678 A * 8/1987 Ohta .................... G02B 6/4208
359/324
(Continued)

FOREIGN PATENT DOCUMENTS

DE 102009016950 A1 10/2010
DE 102010028213 A1 10/2011
(Continued)

OTHER PUBLICATIONS

Insaco.com, "Sapphire," 2004, retrieved Jan. 24, 2018 from URL <https://www.insaco.com/materials/other-materials/sapphire>, 5 pages.
(Continued)

*Primary Examiner* — Ricky D Shafer
(74) *Attorney, Agent, or Firm* — Fish & Richardson P.C.

(57) ABSTRACT

A Faraday rotator includes: a disk-shaped magneto-optical solid-state medium, a magnet generator configured to generate a magnetic field in the magneto-optical solid-state medium, a heat sink with a support surface for the magneto-optical solid-state medium, a reflector mounted between the heat sink and the magneto-optical solid-state medium and configured to reflect a laser beam entering the magneto-optical solid-state medium in a first impingement region on a first side of the magneto-optical solid-state medium facing away from the support surface, and a deflector configured to deflect the laser beam emerging from the magneto-optical solid-state medium back to a second impingement region at least partly overlapping with the first impingement region on the first side. An optical isolator can have at least one such Faraday rotator. A driver laser arrangement can have at least one such optical isolator. An EUV radiation generation apparatus can have such a driver laser arrangement.

14 Claims, 3 Drawing Sheets

(58) Field of Classification Search
USPC ....... 359/280, 484.02, 484.03, 484.04, 484.1
See application file for complete search history.

(56) References Cited

U.S. PATENT DOCUMENTS

| | | | |
|---|---|---|---|
| 5,115,340 A | | 5/1992 | Tidwell |
| 5,715,080 A | * | 2/1998 | Scerbak ................. G02F 1/093 |
| | | | 359/484.04 |
| 6,577,666 B2 | | 6/2003 | Erhard et al. |
| 6,891,874 B2 | | 5/2005 | Erhard et al. |
| 7,068,413 B1 | * | 6/2006 | Fitzgerald ................. G02F 1/09 |
| | | | 359/485.05 |
| 7,463,667 B2 | | 12/2008 | Vetrovec et al. |
| 8,743,458 B2 | | 6/2014 | Nicklaus et al. |
| 10,727,639 B2 | | 7/2020 | Killi et al. |
| 2001/0040909 A1 | | 11/2001 | Erhard et al. |
| 2007/0116081 A1 | | 5/2007 | Vetrovec et al. |
| 2008/0304534 A1 | | 12/2008 | Sumida et al. |
| 2012/0194906 A1 | | 8/2012 | Nicklaus et al. |
| 2014/0139911 A1 | | 5/2014 | Jalali |
| 2014/0218795 A1 | | 8/2014 | Scerbak |
| 2015/0124318 A1 | * | 5/2015 | Scerbak ................. G02F 1/093 |
| | | | 359/484.04 |
| 2017/0176781 A1 | | 6/2017 | Scerbak et al. |
| 2019/0173257 A1 | | 6/2019 | Dominik et al. |

FOREIGN PATENT DOCUMENTS

| | | |
|---|---|---|
| DE | 102016205638 A1 | 10/2017 |
| DE | 102016213561 A1 | 1/2018 |
| EP | 0632551 B1 | 10/1998 |
| EP | 1103090 B1 | 6/2002 |
| EP | 1252687 B1 | 12/2008 |
| WO | WO 2019/158215 A1 | 8/2019 |

OTHER PUBLICATIONS

Mukhin et al., "Use of thin discs in Faraday isolators for high-average power lasers," Quantum Electronics, Oct. 2004, 34(10):973-978.

PCT International Search Report and Written Opinion in International Appln. No. PCT/EP2018/054005, dated Dec. 6, 2018, 17 pages (with English translation).

PCT International Preliminary Report on Patentability in International Appln. No. PCT/EP2018/054005, dated Aug. 27, 2020, 13 pages (with English translation).

* cited by examiner

FARADAY ROTATORS, OPTICAL ISOLATORS, DRIVER LASER ARRANGEMENTS AND EUV RADIATION GENERATION APPARATUS

CROSS REFERENCE TO RELATED APPLICATIONS

This application is a continuation of and claims priority under 35 U.S.C. § 120 from PCT Application No. PCT/EP2018/054005, filed on Feb. 19, 2018, the entire contents of which is incorporated herein by reference.

TECHNICAL FIELD

The invention relates to a Faraday rotator, an optical isolator having such a Faraday rotator, a driver laser arrangement having at least one such optical isolator, and an EUV radiation generation apparatus having such a driver laser arrangement.

BACKGROUND

An optical isolator with a Faraday rotator is disclosed in US 2017/0176781 A1. A magnet arrangement is embodied to generate a magnetic field in a magneto-optical solid-state medium, referred to there as a Faraday optic, said magnetic field being aligned substantially parallel to a propagation direction of a laser beam through the solid-state medium. The disk-shaped magneto-optical solid-state medium can have a highly reflective coating on the second side facing the support surface of the heat sink. The optical isolator of US 2017/0176781 A1 can have a (further) reflector to reflect the laser beam emerging from the magneto-optical solid-state medium back to the magneto-optical solid-state medium, to be precise to a different impingement region on the magneto-optical solid-state medium. As a result of the reflection on the reflector, the number of passes of the laser beam through the solid-state medium, and hence the length of the beam path of the laser beam in the solid-state medium, can be increased.

In contrast to an optical isolator based on an acousto-optic switch or modulator, an optical isolator based on a Faraday rotator does not have any switching times. An optical isolator with a Faraday rotator blocks back-reflected laser radiation at all times, even while laser radiation propagates through said optical isolator in the forward direction. Consequently, an ideal optical isolator can be realized with the aid of a Faraday rotator. However, Faraday rotators are typically not suitable for high laser powers of, e.g., several 100 W or several kW. This applies, in particular, to laser radiation in the infrared wavelength range at approximately 10.6 µm, as generated by a beam source in the form of a CO2 laser.

Such a beam source, which generates high laser power of possibly several kW, can be used, for example, in a so-called driver laser arrangement, which is used in a laser produced plasma, Laser Line Probe (LLP), extreme ultraviolet (EUV) light source or EUV radiation generation apparatus to generate pulsed laser radiation (i.e., a sequence of laser pulses). The pulsed laser radiation is typically amplified by a plurality of optical amplifiers of an amplifier arrangement of the driver laser arrangement. The laser radiation, generated and amplified by the driver laser arrangement, is supplied to a focusing device via a beam guiding device, said focusing device focusing the laser radiation on a target region where a target material, for example in the form of tin droplets, is provided, said target material transitioning into a plasma state when irradiated by the pulsed laser radiation and emitting EUV radiation in the process.

In such an EUV radiation generation apparatus, a portion of the pulsed laser radiation is reflected back at the target material and passes through the beam guiding device and the optical amplifiers of the amplifier arrangement in the backward direction, and so the back-reflected laser radiation is likewise amplified. As a result, the gain of the amplifier medium in the optical amplifiers reduces, and so the maximum attainable power when amplifying the laser radiation propagating in the forward direction, i.e., in the direction of the target material, is reduced. It is typically necessary to filter the back-reflected laser radiation to protect the beam source from being destroyed by the back-reflected laser radiation. In conventional optical isolators with a Faraday rotator, this is only possible up to a limited maximum power of the laser radiation.

Effective heat dissipation from the magneto-optical solid-state material represents a problem when using a Faraday rotator for high laser powers. If the heat dissipation is too low, the magneto-optical solid-state material can be destroyed by the laser radiation. To improve the heat dissipation, US 2017/0176781 A1 proposes to solder the Faraday optic to the housing of a heat sink, either directly or via a protection layer and a metallization layer. The Faraday optic could also have a layer structure with a transparent heat-conducting layer, which is applied to one or both sides of a diamagnetic, paramagnetic or ferromagnetic Faraday rotating material, as described in US 2014/0218795 A1. The heat-conducting layer should implement heat conduction in the magneto-optical material in a manner substantially parallel to the beam path of the laser beam so as to eliminate radial temperature gradients which are responsible for a shift in the focal position or a deterioration in the beam quality as a result of thermal lensing and thermal birefringence.

The article "Use of thin discs in Faraday isolators for high-average power lasers", Quantum Electronics 34(10), 973-978 (2004), I. B. Mukhin, E. A. Khazanov, cited in US 2014/0218795 A1, proposes a Faraday isolator which is formed from a plurality of thin magneto-optical disks. The proposal therein is to dissipate heat from the disks by virtue of letting helium gas flow over the optical surfaces of the disks such that the heat flux extends substantially in the direction of beam propagation. This should likewise reduce the (radial) temperature gradient across the beam profile of the laser beam, which is responsible for the generation of thermal lensing and (thermal) birefringence.

SUMMARY

Implementations of the invention provide Faraday rotators, optical isolators, driver laser arrangements, and EUV radiation generation apparatus, each of which can withstand high laser powers.

One aspect of the invention features a Faraday rotator with a disk-shaped magneto-optical solid-state medium, a magnet generator configured to generate a magnetic field in the magneto-optical solid-state medium, a heat sink with a support surface for the magneto-optical solid-state medium, a reflector mounted between the heat sink and the magneto-optical solid-state medium and configured to reflect a laser beam entering the magneto-optical solid-state medium in a first impingement region on a first side of the magneto-optical solid-state medium facing away from the support surface, and a deflection device configured to deflect the laser beam emerging from the magneto-optical solid-state medium back to a second impingement region at least partly overlapping with the first impingement region on the first side. In the Faraday rotator, the deflection device is embodied to deflect preferably multiple times the laser beam back to an impingement region which at least partly overlaps with the impingement region, in particular which is (virtually or practically) identical to the impingement region, on the first side of the magneto-optical solid-state medium.

In contrast to the Faraday rotator described in US 2017/0176781 A1, in which the laser beam is deflected back to a second impingement region, not overlapping with the first impingement region, on the first side of the magneto-optical solid-state medium, typically one and the same (virtually identical) impingement region is used in the Faraday rotator. Therefore, only one impingement region is referred to below, on which the laser beam impinges multiple times such that the laser beam passes through the magneto-optical solid-state medium at the same location or in the same volume region not only twice but at least four times. By using one and the same impingement region for the laser beam, the disk-shaped magneto-optical solid state medium can have a diameter that is only slightly larger than the diameter of the laser beam impinging on the magneto-optical solid-state medium, and so the outlay for producing the magneto-optical solid-state medium and generating a homogeneous magnetic field is minimized. Both the impingement region and the disk-shaped magneto-optical solid-state medium themselves preferably have a circular geometry. In some examples, in terms of its geometry and arrangement, the impingement region on the first side of the solid-state medium substantially corresponds to an impingement region on the reflector on the second side of the solid-state medium.

In some embodiments, the deflection device is embodied to deflect the laser beam at least two times, preferably at least four times, in particular at least six times into the same impingement region on the first side of the magneto-optical solid-state medium. By increasing the number of passes of the laser beam through the disk-shaped magneto-optical solid-state medium, it is possible to reduce the thickness of the laser medium required to obtain a desired overall polarization rotation (as a rule, 45°; see below). As a result of the reduction in the thickness of the magneto-optical solid-state material, its power durability can be increased. Although the strength of the magnetic field generated in the magneto-optical solid-state material could also be increased to increase the rotation angle of the polarization rotation, there are limits to this approach.

To realize a deflection device which is embodied to deflect a laser beam multiple times to the same site, use can be made, for example, of an optical arrangement as is known from pump optics for a disk laser. In such pump optics, a pump laser beam is irradiated multiple times on a disk-shaped laser medium at the same location or in the same impingement region by virtue of the pump laser beam being deflected multiple times. To this end, the Faraday rotator can have a deflection device in the form of a refocusing optical unit, as described in EP 1 103 090 B1, for example. Here, the laser beam is initially focused on the solid-state medium, more precisely on the reflector, by means of an imaging or focusing optical unit. The refocusing optical unit serves to convert the laser beam emerging divergently from the solid-state medium into an intermediate collimated laser beam and to convert the intermediate collimated laser beam anew into a laser beam that is incident on the solid-state medium and focused on the latter, with the laser beam always impinging on the same impingement region on the first side of the laser medium. In respect of details relating to the refocusing optical unit, reference is made to EP 1 103 090 B1, the entirety of which is incorporated in this application by reference.

EP 1 252 687 B1, the entirety of which is likewise incorporated in this application by reference, has disclosed the use of a focusing device with at least one deflection unit to penetrate a solid body multiple times with a pump radiation field. EP 1 252 687 B1 describes different options for realizing beam folding for deflecting the laser beam, which can be used for the Faraday rotator.

In one embodiment of the Faraday rotator the deflection device comprises a focusing device, in particular a concave mirror, with a reflection surface for focusing the laser beam onto the magneto-optical solid-state medium and at least one deflection unit for deflecting the laser beam between a plurality of reflection regions formed on the reflection surface, said reflection regions preferably being arranged in different angular regions about a central axis of the reflection surface. The reflection surface, which may be embodied in the style of an (optionally segmented) parabolic mirror for example, is used as a refocusing optical unit for converting the laser beam divergently emerging from the magneto-optical solid-state medium into an intermediate collimated laser beam, which passes through the deflection unit. For the purposes of deflecting the laser beam, the deflection device can have one or more deflection units. By way of example, the deflection units can be embodied as described in EP 1 252 687 B1, which presents various options for realizing beam folding of the laser beam by means of one or more deflection units.

A focusing device is not mandatory for realizing a multiplicity of passages through the magneto-optical solid-state medium: With the aid of the deflection device, the laser beam can possibly be deflected multiple times onto the impingement region on the magneto-optical solid-state medium as well, without focusing being implemented to this purpose.

In an alternative embodiment, the deflection device comprises a plurality of reflective elements, formed on which are (plane) mirror surfaces for deflecting the laser beam, wherein the mirror surfaces of the reflective elements are aligned in such a way that the laser beam is deflected from a respective mirror surface to another mirror surface via the magneto-optical solid-state medium. The reflective elements, for example in the form of mirrors, are preferably arranged in pairs, the laser beam being deflected between the mirror surfaces thereof over the magneto-optical solid-state medium. Such a deflection device comprising a plurality of pairs of relay mirrors, each with a first and a second mirror, has been disclosed in U.S. Pat. No. 7,463,667 B2 and DE 10 2016 213 561 A1, the entirety of which are incorporated in this application by reference. In the multi-pass resonator described therein, the laser beam is reflected back and forth between one and the same location on a solid-state laser gain material module and each pair of the plurality of pairs of relay mirrors.

It is understood that there are a multiplicity of options for realizing a deflection device for generating multiple passes through the magneto-optical solid-state material, the options described further above only representing a selection thereof.

In a further embodiment, the magneto-optical solid-state material is selected from the group comprising: InAs and terbium gallium garnet. A multiplicity of magneto-optical materials come into question for use in a Faraday rotator. By way of example, semiconductor materials such as InAs can be used as magneto-optical materials, as is described, for example, in US 2014/0139911 A1, the entirety of which is incorporated in this application by reference. Other materials, for example ferromagnetic, paramagnetic or diamagnetic materials, can also be used as magneto-optical solid-state medium.

In a further embodiment, the reflector forms a reflective coating, which is preferably applied to the side of the magneto-optical solid-state medium facing the support surface. To optimize the heat dissipation from the magneto-optical solid-state medium to the heat sink, the reflective coating is preferably formed from at least one material which has a higher thermal conductivity than the magneto-optical solid-state medium. The material of the reflective coating is matched to the wavelength of the laser beam and preferably selected from the group comprising: ZnSe, ZnS, ThF4 and YbF3. These materials are particularly suitable for a laser beam with a wavelength of approximately 10.6 μm. The use of Ge in the reflective coating should be avoided as this material easily absorbs.

In a further embodiment, an anti-reflection coating is applied to the side of the magneto-optical solid-state medium facing away from the support surface. The anti-reflection coating, which is applied at least in the impingement region, is intended to ensure that the greatest possible component of the intensity of the laser beam enters the magneto-optical solid-state medium on the first side and the smallest possible component of the intensity of the laser beam is reflected at the first side.

In one embodiment, at least one heat-conducting layer is applied between the magneto-optical solid-state medium and the support surface of the heat sink. To optimize the heat dissipation from the magneto-optical solid-state medium to the support surface of the heat sink, the heat-conducting layer is typically formed from at least one material which has a higher thermal conductivity than the magneto-optical solid-state medium. The material of the heat-conducting layer is preferably selected from the group comprising: synthetic diamond, (undoped) yttrium aluminum garnet (YAG), (undoped) silicon, germanium, sapphire, preferably c-axis sapphire, (hydrogenated) diamond-like carbon, (non-hydrogenated) tetrahedral carbon. As a rule, the heat-conducting layer is applied between the reflective coating and the support surface. However, the heat-conducting layer itself could also serve as a (highly) reflective coating provided the material of the heat-conducting layer is sufficiently reflective for the wavelength of the laser beam. A metallization layer can be applied to the heat-conducting layer to connect the magneto-optical solid-state medium, more precisely the heat-conducting layer, to the support surface of the heat sink by soldering.

It is generally advantageous for heat dissipation if a temperature gradient forms between the magneto-optical solid-state medium and the heat sink, said temperature gradient extending substantially parallel to the thickness direction of the disk-shaped solid-state medium or parallel to the propagation direction of the laser beam in the disk-shaped solid-state medium. By contrast, a temperature gradient transversely to the thickness direction or in the radial direction leads to the above-described effects of thermal lensing and thermal birefringence, which should be avoided. There are a number of options for generating a temperature gradient extending substantially parallel to the thickness direction or to the propagation direction of the laser beam, some of which are described in EP 0 632 551 B1, the entirety of which is incorporated in this application by reference.

In one embodiment of the Faraday rotator, the heat sink has at least one cooling channel for passing through a cooling fluid. The heat sink can have one or more cooling channels, which extend, for example, in the direction of the support surface. Such a cooling channel or such a cooling bore can have a base that ends in the region of the support surface. In respect of details relating to the embodiment of the cooling channel or channels, reference is made to EP 0 632 551 B1.

In a further embodiment, the support surface of the heat sink is curved in concave or convex fashion. In this case, the magneto-optical solid-state material or the entire solid body fastened to the support surface can likewise have a corresponding concave or convex curvature such that the magneto-optical solid-state material has a constant thickness. The curvature of the support surface can serve to compensate thermally caused deformations of the solid body or of the magneto-optical solid-state material.

Another aspect of the invention features an optical isolator comprising at least one Faraday rotator and a first polarizer device and a second polarizer device, between which the (at least one) Faraday rotator is arranged.

What is exploited for the use of a Faraday rotator as an optical isolator is that the sign of the rotation angle of the polarization rotation in a Faraday rotator is independent of the propagation direction of the laser beam in the magneto-optical solid-state medium. This means that the rotation angle of the polarization rotation doubles for a laser beam that passes through the magneto-optical solid-state medium twice in opposing propagation directions. If the Faraday rotator or the magneto-optical solid-state medium generates a polarization rotation through 45° of the laser beam coming from the first polarizer device and if the laser beam is reflected back at an object and passes through the Faraday rotator again in the reverse direction, then the polarization direction is rotated through a rotational angle of 45° again. Consequently, the back-reflected laser beam impinges on the first polarizer device with a polarization rotated through 90° and can, for example, be deflected by the latter to a beam trap or the like. The second polarizer device prevents entry into the optical isolator of the back-reflected laser radiation with a polarization deviating from the 45° rotated polarization direction.

It is understood that the optical isolator could have additional optical components, for example an additional phase-shifting or polarization-rotating optical component, e.g., in the form of a λ/2 plate, or a polarization-rotating coating. This may be advantageous if the two polarizer devices should each transmit a polarization direction of the laser beam which are not aligned at an angle of 45° to one another, for example with an identical alignment of the polarization direction. This allows both polarizer devices to be formed on one and the same main body, as is described in US 2017/0176781 A1, for example.

The polarizer devices can also possibly be embodied to split an unpolarized laser beam into two radiation components polarized perpendicular to one another, which radiation components can for example pass through two different Faraday rotators or two different magneto-optical solid-state media. By way of example it may be useful to use such polarizer devices if the incident laser beam is unpolarized. The use of two different Faraday rotators can be advantageous for example if one and the same optical isolator should be used for the optical isolation of two (pulsed) laser beams of different wavelengths. In this case, the laser beams can enter the first polarizer device with a polarization direction rotated by 90° relative to one another and said first polarizer device steers the laser beams to different Faraday rotators or different magneto-optical solid-state media, the polarization rotation of which is matched to the respective wavelength.

A magnet arrangement for an optical isolator which facilitates the reception of the plurality of magneto-optical solid-state media (Faraday media) has been disclosed in DE 10 2009 016 950 A1, for example. There, a magnetic field of more than 0.7 T can be generated in a free aperture of the magnet arrangement. Optionally, the magnet arrangement can be embodied to set the field strength of the magnetic field in the magneto-optical material. By way of example, a distance (gap) between the magneto-optical material and the magnet or magnets of the magnetic field arrangement could be set to this end with the aid of an actuator or the like.

A further aspect of the invention features a driver laser arrangement for an EUV radiation generation apparatus, comprising: a beam source for generating at least one laser beam which propagates in a first direction, an amplifier arrangement with at least one optical amplifier for amplifying the laser beam propagating in the first direction, and at least one optical isolator as described above for suppressing laser radiation propagating in a second direction opposite to the first.

A driver laser arrangement for so-called laser produced plasma, LLP, EUV light sources or EUV radiation generation apparatuses have a beam source, for example one or more CO2 lasers, for generating one or more pulsed laser beams (a sequence of laser pulses). The pulsed laser beam is typically amplified by a plurality of optical amplifiers of an amplifier arrangement of the driver laser arrangement. When generating EUV radiation by irradiating a target material with the (pulsed) laser beam, a portion of the pulsed laser beam is reflected back at the target material and can be filtered at the at least one optical isolator to protect the beam source from destruction by the back-reflected laser radiation and to possibly counteract a reduction in the gain of the laser beam propagating in the first direction.

A further aspect of the invention features an EUV radiation generation apparatus comprising such a driver laser arrangement, a vacuum chamber in which a target material is situated or arrangeable, and a beam guiding device for guiding the laser beam propagating in the first direction from the driver laser arrangement to the target material. The laser radiation, generated and amplified by the driver laser arrangement, is supplied to a focusing device via a beam guiding device, said focusing device focusing the laser radiation on a target region where a target material, for example in the form of tin droplets, is provided, said target material transitioning into a plasma state when irradiated by the laser radiation and emitting EUV radiation in the process. As described further above, laser radiation reflected back by the target material can reach the driver laser arrangement and is suppressed by means of the optical isolator. It is understood that the optical isolator could also possibly be arranged at a different location in the beam path of the laser beam than in the driver laser arrangement.

Further advantages of the invention are apparent from the description and the drawing. The aforementioned features and the features mentioned further below can likewise be employed in each case by themselves or in any desired combination. The embodiments shown and described should not be understood to be an exhaustive list, but rather have an exemplary character for the purpose of illustrating the invention.

DETAILED DESCRIPTION

In the following description of the drawings, identical reference signs are used for the same components or for components having the same function.

Figure 1:
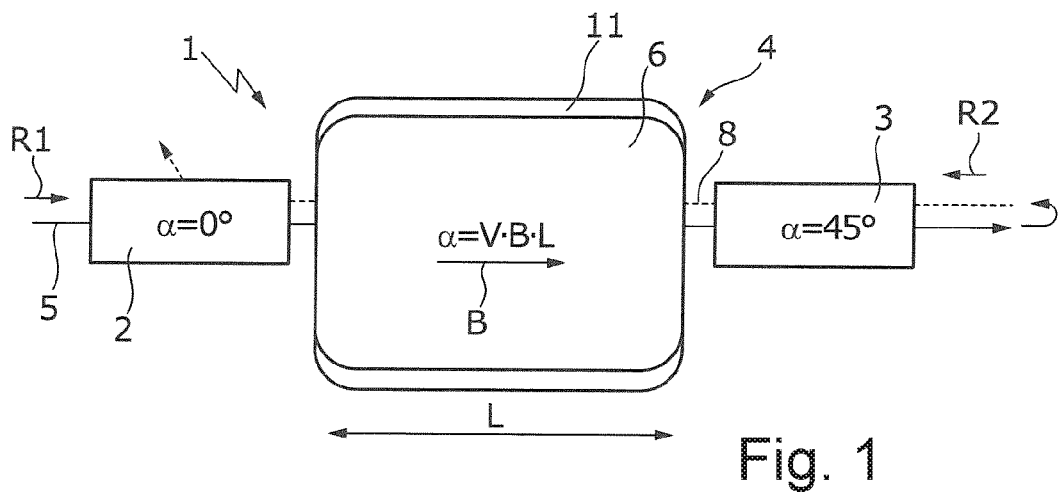
FIG. 1 shows a schematic illustration of an optical isolator with a Faraday rotator operated in transmission.

FIG. 1 illustrates the basic principle of an optical isolator 1, which comprises a first polarizer device 2 and a second polarizer device 3, between which a Faraday rotator 4 is arranged. A laser beam 5 propagating in a first direction R1 enters the first polarizer device 2, which only allows one polarization direction of the laser beam 5 to pass to the Faraday rotator 4, said polarization direction having a rotational angle of $\alpha=0°$ in relation to an arbitrarily set reference angle. The laser beam 5 with a linear polarization downstream of the first polarizer device 2 enters the Faraday rotator 4, which in the example shown has a magneto-optical solid-state medium 6 with a Verdet constant V (depending on the laser beam wavelength $\lambda$) which is given by:

$$V(\lambda) = \frac{e}{m_e} \frac{\lambda}{2c} \frac{dn}{d\lambda},$$

wherein e is a charge of an electron, $m_e$ is a mass of the electron, and c is the velocity of light, n is the refractive index of the magneto-optical solid-state medium 6.

The rotation angle $\alpha$ of the polarization rotation when passing through the magneto-optical solid-state medium 6 of the Faraday rotator 4 is given by $\alpha=V\,B\,L$, i.e., in addition to the Verdet constant V, the rotation angle $\alpha$ also depends on the length L of the propagation path of the laser beam 5 in the solid-state material 6 and on the magnetic flux density B in the solid-state material 6. The magnetic flux density or the (permanent) magnetic field B is generated by a magnet arrangement (or a magnet generator) 11 which surrounds the magneto-optical solid-state material 6, the latter possibly being InAs or terbium gallium garnet, for example.

The flux density B, the Verdet constant V and the length L of propagation in the magneto-optical solid-state medium 6 are set in such a way that a rotation angle $\alpha$ of 45° arises for the laser beam 5 propagating in the first direction R1. The second polarizer device 3 is embodied to transmit the laser beam 5 with the polarization direction which has been rotated through 45°. A component of the intensity of the laser beam 5 is reflected at an object (not shown) after passing through the second polarizer device 3 and this forms the back-reflected laser radiation 8, which propagates in a second direction R2 opposite to the first direction R1. The back-reflected laser radiation 8 passes through the second polarizer device 3 and the Faraday rotator 4. When passing through the Faraday rotator 4 again, there is another polarization rotation through the rotation angle α of 45°, and so the back-reflected laser radiation 8 experiences a polarization rotation through α=90° overall. As indicated in FIG. 1, the back-reflected laser radiation 8 with the polarization direction rotated through 90° is deflected by the first polarizer device 2 to a beam trap (not shown).

A problem with the optical isolator 1 illustrated in FIG. 1 is that the latter can only be used up to a laser power of approximately 10 W if InAs is used as magneto-optical solid-state medium 6 and the laser beam 5 has a wavelength in the infrared wavelength range of approximately 10.6 μm, as is generated by a $CO_2$ laser. Significantly higher laser powers may optionally be possible if terbium gallium garnet is used as a solid-state medium 6 and a laser beam 5 is generated at a wavelength of approximately 1 μm, as generated by a solid-state laser.

Figure 2:
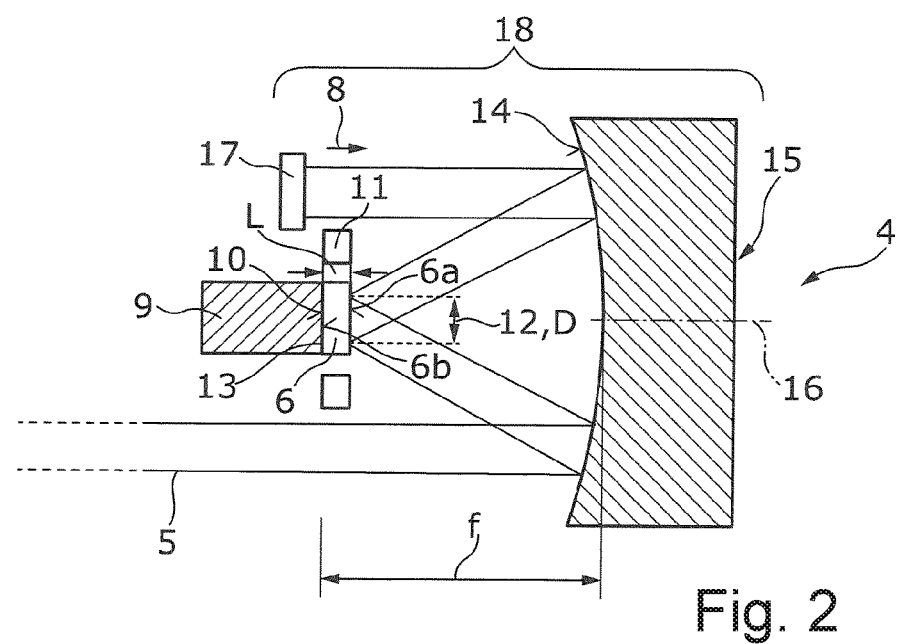
FIG. 2 shows an illustration of an exemplary embodiment of a Faraday rotator having a focusing device and having a deflection unit for deflecting a laser beam multiple times onto the same impingement region of a disk-shaped magneto-optical solid-state medium.

To increase the power durability of the Faraday rotator 4, a disk-shaped magneto-optical solid-state medium 6 is used in the Faraday rotator 4 shown in FIG. 2, said magneto-optical solid-state medium having a comparatively small thickness and consequently a short length L of the propagation path of the laser beam 5 in the thickness direction. To increase the overall length L of the propagation path of the laser beam 5 through the Faraday rotator 4, the magneto-optical solid-state medium 6 is passed through multiple times in the following examples, to be precise at one and the same location or in the same volume region of the magneto-optical solid-state medium 6. In the example illustrated in FIG. 2, the Faraday rotator 4 is arranged, analogously to FIG. 1, between a first polarizer device 2 and a second polarizer device 3 in an optical isolator 1.

In the Faraday rotator 4 shown in FIG. 2, the disk-shaped magneto-optical solid-state medium 6 is embodied in the form of a circular disk. The magneto-optical solid-state medium 6 is arranged on a support surface 10 of a heat sink 9, which is formed from a metallic material, e.g., copper. A magnet arrangement 11 serves to generate a permanent magnetic field B in the magneto-optical solid-state medium 6. Here, the magnetic field B extends perpendicular to the two opposing parallel plane sides 6a,b of the disk-shaped solid-state medium 6. The direction of the magnetic field B consequently substantially corresponds to the propagation direction of the laser beam 5, which impinges on the first side 6a of the disk-shaped magneto-optical solid-state medium 6, facing away from the support surface 10, in a circular impingement region 12. The diameter D of impingement region 12 is a few millimeters, e.g., approximately 5 mm, and is only slightly smaller than the diameter of the disk-shaped solid-state medium 6, which is approximately 1 to 2 mm larger, for example. The thickness of the disk-shaped solid-state medium 6, and hence the length L of the propagation path of the laser beam 5 through the disk-shaped solid-state medium 6, is approximately 1 mm in the example shown. A reflective coating 13 is applied to the side 6b of the disk-shaped solid-state medium 6 facing the support surface 10 (i.e., at the lower side), said reflective coating forming a reflector at which the laser beam 5 is reflected back to the first side 6a of the magneto-optical solid-state medium 6. To deflect the laser beam 5 emerging from the solid-state medium 6 at the first side 6a back to said solid-state medium, the Faraday rotator 4 comprises a deflection device (or a deflector) 18, which is formed, in FIG. 2, from a focusing device 15 and three deflection units 17, of which only one is illustrated in FIG. 2.

Figure 3:
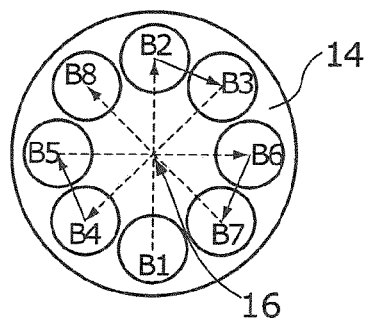
FIG. 3 shows an illustration of a reflection surface of the focusing device of FIG. 2 with eight reflection regions which are arranged about a central axis in regular fashion.

The laser beam 5 transmitted by the first polarizer arrangement 2 of the optical isolator 1, collimated in the example shown, initially impinges in the Faraday rotator 4 on a reflection surface 14 of the focusing device, which is embodied as a concave mirror 15. The reflection surface 14 illustrated in FIG. 3 extends rotationally symmetrically with respect to a central axis 16 of the concave mirror 15 and is curved in parabolic fashion, i.e., the concave mirror 15 forms a parabolic mirror. The collimated laser beam 5 coming from the first polarizer device 2 extends parallel to the central axis 16 of the concave mirror 15 in the example shown.

The collimated laser beam 5 is reflected at the parabolic reflection surface 14, more precisely at a first reflection region B1 of a total of eight reflection regions B1 to B8 of the reflection surface 14, to be precise in the direction of the magneto-optical solid-state medium 6 arranged in the focus or in the focal plane of the concave mirror 15 (with the focal length f).

The laser beam 5 is subsequently reflected at the reflective coating 13 on the back side of the solid-state medium 6, incident on a second reflection region B2 of the reflection surface 14 in divergent fashion, collimated at the latter on account of the parabolic geometry of the reflection surface 14 and subsequently incident on the first of the three deflection units 17, which, for example, is embodied in the form of a prism (bi-prism) and which laterally offsets the collimated laser beam 5 extending parallel to the central axis 16 of the concave mirror 15 proceeding from the second reflection region B2 and reverses the beam direction of said laser beam 5 such that the latter impinges the reflection surface 14 in a third reflection region B3. At the third reflection region B3, the laser beam 5 is focused onto the magneto-optical solid-state medium 6 again and said laser beam impinges on the fourth reflection region B4 following the reflection at the reflective coating 13. The laser beam 5 is deflected to the fifth reflection region B5 with the aid of the second deflection unit (not shown). Analogously, the laser beam 5 passes through the sixth to eighth reflection region B6 to B8. The laser beam 5 reflected at the eighth reflection region B8 leaves the Faraday rotator 4 in the direction of the second polarizer 3 parallel to the central axis 16.

With the aid of the deflection device 18 described further above, the laser beam 5 is focused on the magneto-optical solid-state medium 6 a total of four times, and so the length L of the solid-state medium 6 parallel to the central axis 16 of the concave mirror 15 is passed through a total of eight times on account of the reflection at the reflective coating 13. In the example shown in FIG. 3, the reflection regions B1 to B8 are arranged equidistantly about the central axis 16. However, to increase the number of passes through the magneto-optical solid-state medium 6, it is also possible to use a reflection surface 14 in which the reflection regions are arranged at different distances from the central axis 16.

Figure 4:
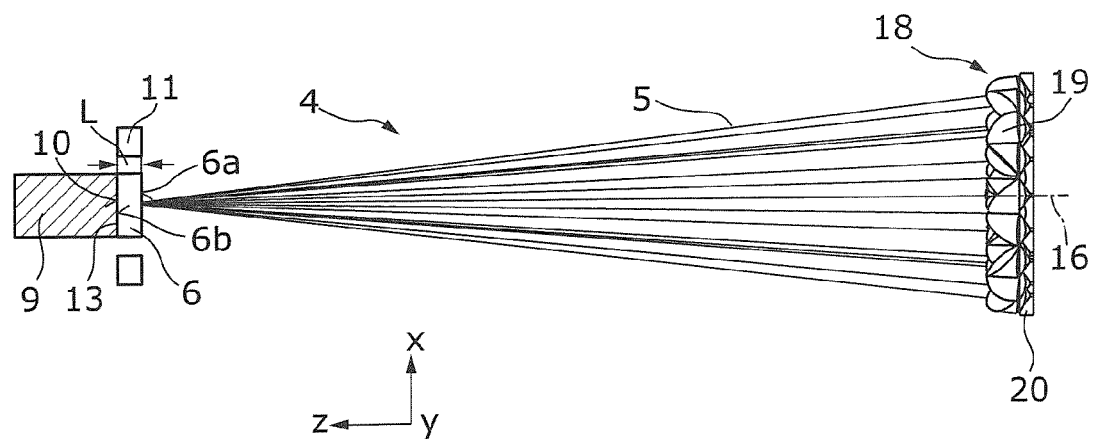
FIG. 4 shows an illustration of a further exemplary embodiment of the Faraday rotator having a deflection device and having a plurality of reflective optical elements.

To generate a plurality of passes through the magneto-optical solid-state medium 6, it is not mandatory for the laser beam 5 to be focused on the magneto-optical solid-state medium 6. FIG. 4 shows such a Faraday rotator 4, in which the magneto-optical solid-state medium 6 is attached to a support surface 10 of a heat sink 9 in a manner analogous to FIG. 2, where a reflective coating 13 is applied to the back side 6b of the solid-state medium 6.

Figure 5:
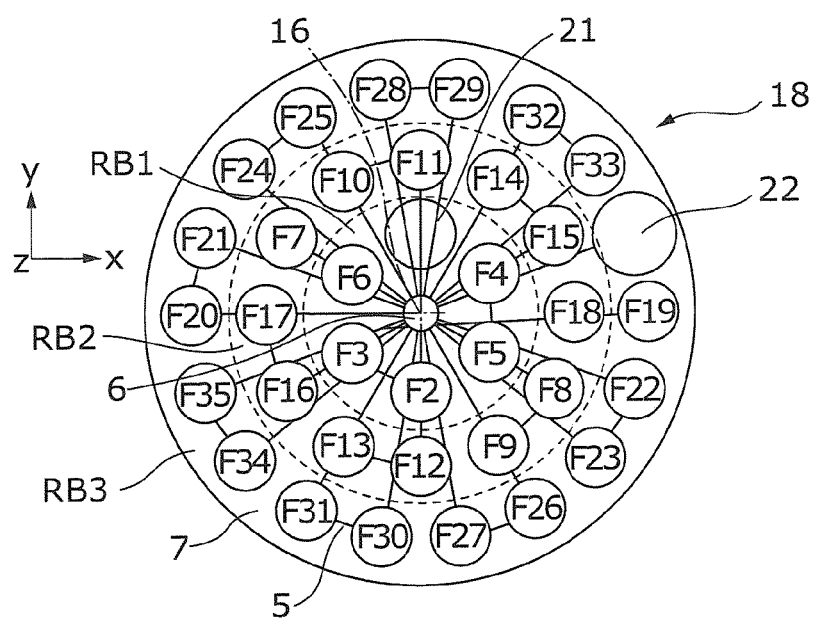
FIG. 5 shows a schematic illustration of a plan view of mirror surfaces of the reflective optical elements, which are arranged in three circular rings.

In the Faraday rotator 4 shown in FIG. 4, a multiple passage through the magneto-optical solid-state medium 6 is realized by virtue of the laser beam 5 being deflected at reflective optical elements in the form of deflection mirrors 19, more precisely at the mirror surfaces F2 to F35 thereof (cf. FIG. 5). The deflection mirrors 19 are fastened to a plate-shaped main body 20 of a deflection device 18. It is understood that the deflection device 18 could also have a larger or smaller number of deflection mirrors 19. In the example shown, the plate-shaped main body 20 is aligned parallel to the XY-plane of an XYZ-coordinate system and parallel to the disk-shaped magneto-optical solid-state medium 6.

As can be identified in FIG. 5, the laser beam 5, which has passed through the first polarizer device 2, not illustrated, of the optical isolator 1 shown in FIG. 1, initially passes through the plate-shaped main body 20 via an aperture opening 21 and is aligned in the process in such a way that said laser beam impinges centrally on the magneto-optical solid-state medium 6 and is reflected at the latter, more precisely at the mirrored back side 13 thereof, to a second mirror surface F2. The laser beam 5 emanating from the magneto-optical solid-state medium 6 is deflected or reflected at the second mirror surface F2 directly to a third, adjacent mirror surface F3. In respect of the magneto-optical solid-state medium 6, the third mirror surface F3 is aligned in such a way that the laser beam 5 is deflected or reflected back to the magneto-optical solid-state medium 6 from the third mirror surface F3. At the magneto-optical solid-state medium 6, the laser beam 5 is deflected to a fourth mirror surface F4, from where it is directly reflected to a fifth mirror surface F5, etc.

In the deflection device 18 shown in FIG. 5, the laser beam 5 is consequently alternately deflected between the magneto-optical solid-state medium 6 and a respective pair of mirror surfaces F2, F3; F4, F5; F5, F6; . . . ; F34, F35, arranged adjacently in the example shown. The beam path of the laser beam 5 between the magneto-optical solid-state medium 6 and the mirror surfaces F2, F3; F4, F5; F5, F6; . . . ; F34, F35, more precisely a projection thereof in the XY-plane, is likewise illustrated in FIG. 5. In the example shown in FIG. 5, the deflection device 18 has a further passage opening 22 to couple the laser beam 5 out of the Faraday rotator 4 in the direction of the second polarizer device 3. As may be likewise identified in FIG. 5, the mirror surfaces F2 to F35 are arranged in three ring regions RB1, RB2, RB3 about the central axis 16 of the main body 20. It is understood that a different arrangement of the mirror surfaces F2 to F35 is also possible.

Figure 6A:
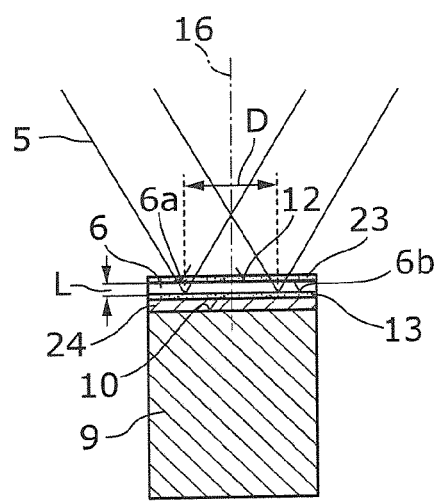
FIGS. 6A and 6B show schematic illustrations of the disk-shaped magneto-optical solid-state medium arranged on a support surface of a heat sink.
Figure 6B:
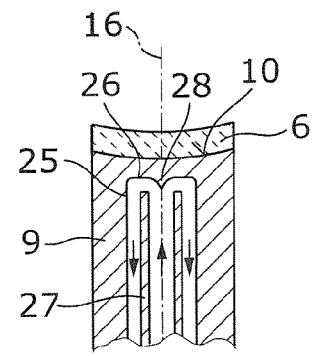

FIGS. 6A and 6B show exemplary detailed illustrations of the disk-shaped magneto-optical solid-state medium 6 attached to the support surface 10 of the heat sink 9. As described further above in the context of FIG. 2, a reflective coating 13 is applied to a back side 6b of the magneto-optical solid-state medium 6 to reflect the laser beam 5 entering the solid-state medium 6. To cool the solid-state medium 6, the reflective coating 13 of the example shown has a material with a greater thermal conductivity than that of the magneto-optical solid-state medium 6, which is (crystalline) InAs in the example shown. By way of example, the reflective coating 13 can be formed from ZnSe, ZnS, ThF$_4$ or YbF$_3$.

As may likewise be identified in FIG. 6A, an anti-reflection coating 23 is applied to the front side 6a of the magneto-optical solid-state medium 6. A heat-conducting layer 24 is applied between the magneto-optical solid-state medium 6, more precisely between the reflective coating 13 and the support surface 10 of the heat sink 9, said heat-conducting layer being formed from (synthetic) diamond in the example shown. It is understood that the heat-conducting layer 24 could also be formed from different materials, for example YAG, silicon, germanium, sapphire, diamond-like carbon, tetrahedral carbon etc. By way of example, the heat-conducting layer 24 can be connected to the support surface 10 of the heat sink 9 by soldering, with use being made of a metallization layer. It is understood that other measures for improving the cooling of the magneto-optical solid-state medium 6 could be provided in addition or as an alternative to the heat-conducting layer 24.

FIG. 6B shows the disk-shaped magneto-optical solid-state medium 6, which is attached to a concavely curved support surface 10 of the heat sink 9. Accordingly, the magneto-optical solid-state medium 6 itself, and consequently its front side 6a and its back side 6b, is also concavely curved such that the solid-state medium rests on the support surface 10 over the entire area. In the example shown in FIG. 6B, the concavely curved solid-state medium 6 has a constant thickness. Displaying the reflective coating 13 and further layers between the solid-state medium 6 and the support surface 10 was dispensed with in FIG. 6B. Instead of the concave curvature shown in FIG. 6B, the support surface 10, and hence also the solid-state medium 6, can have convex curvature.

As may likewise be identified in FIG. 6B, the heat sink 9 has a cooling channel 25 to cool the magneto-optical solid-state medium 6 with the aid of a cooling medium, not shown, for example water. The cooling channel 25 has a base 26 which ends in the vicinity of the support surface 10. For the cooling medium to flow through the cooling channel 25, a pipe 27 projects into the cooling channel 25, said pipe forming, for the cooling fluid, an inflow channel within the pipe 27 and an outflow channel outside of the pipe 27, as indicated by arrows in FIG. 6B. An opening of the pipe 27 faces the base 26, where a conical deflection surface 28 has been mounted to deflect the cooling fluid from the inflow channel within the pipe 27 radially to the outside with respect to the center axis 16 and to the outflow channel. In respect of further details relating to the cooling of the heat sink 9 by means of a cooling fluid, reference is made to EP 0 632 551 B1.

Figure 7:
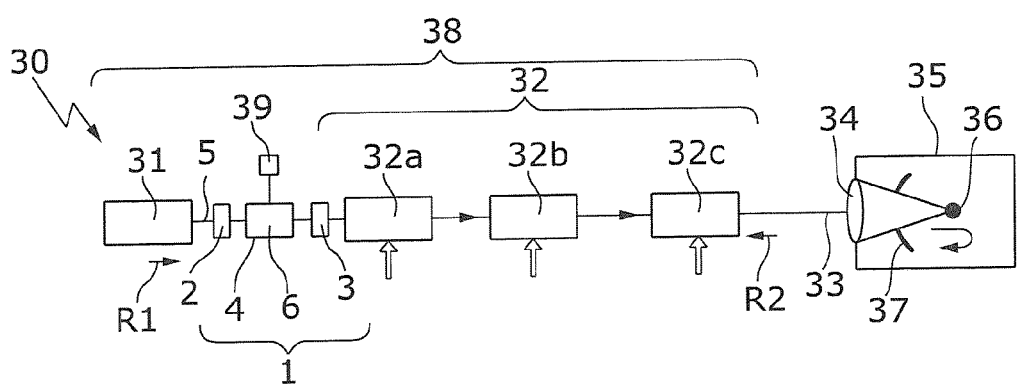
FIG. 7 shows an illustration of an EUV radiation generation apparatus having a driver laser arrangement, which has an optical isolator with a Faraday rotator.

FIG. 7 shows an EUV radiation generation apparatus 30, which comprises a beam source 31, an amplifier arrangement 32 with three optical amplifiers or amplifier stages 32a-c, a beam guiding device 33 (e.g., having a plurality of optical elements to increase or decrease a beam diameter of the laser beam, such as paraboloid mirrors (or parabolic mirrors), as described in WO 2014/048563 A1, the entirety of which is incorporated in this application by reference) not illustrated in any more detail, and a focusing device 34 (e.g., an optical lens). The focusing device 34 is used to focus the laser beam 5, which is generated by the beam source 31 and amplified by the amplifier arrangement 32, at a target region in a vacuum chamber 35, in which a target material 36 in the form of tin droplets is introduced. Upon irradiation with the laser beam 5, the target material 36 transitions into a plasma state and emits EUV radiation, which is focused using a collector mirror 37, in the process. In the example shown in FIG. 7, the collector mirror 37 has an opening for the passage of the laser beam 5. In the shown example, the beam source 31 has two $CO_2$ lasers to generate a pre-pulse and a time offset main pulse, which are amplified together in the amplifier arrangement 32 and which are focused on the target material 36. The beam source 31 forms, together with the amplifier arrangement 32, a driver laser arrangement 38 of the EUV radiation generation apparatus 30.

During the irradiation with the laser beam 5, a radiation component is reflected back at the target material 36, said reflected component passing through the amplifier arrangement 32 in the reverse direction R2 to the propagation direction R1 of the laser beam 5. To suppress the back-reflected laser radiation, an optical isolator 1 is arranged between the beam source 31 and the amplifier arrangement 32 in the example shown in FIG. 7. As described in the context of FIG. 1, the optical isolator has a first and second polarizer device 2, 3, between which a Faraday rotator 4, embodied as described above, is arranged. The back-reflected laser radiation can be deflected at the first polarizer device 2 to a beam trap, not shown, and therefore it does not reach the beam source 31.

The optical isolator 1, or a further optical isolator, could also be arranged between any two of the optical amplifiers 32a-c, between the third optical amplifier 32c and the beam guiding device 33 or at any other point between the beam source 31 and the target material 36. As may likewise be identified in FIG. 7, a control device (or a controller) 39 for the Faraday rotator 6 can be provided, said control device acting on the magnetic field arrangement 11, not shown in FIG. 7, to set the strength of the magnetic field B in the magneto-optical solid-state medium 6. This can be advantageous to compensate possible temperature-related changes in the rotation angle α of the polarization rotation of the Faraday rotator 4 or to match the Faraday rotator 4 to other wavelengths. By way of example, this can be useful if the pre-pulse generated by the beam source 31 and the subsequent main pulse have a (possibly slightly) different wavelength.

What is claimed is:

1. A system for EUV radiation generation, the system comprising:
    a driver laser system comprising:
        a beam source configured to generate at least one laser beam propagating in a first direction;
        an amplifier system comprising at least one optical amplifier configured to amplify the laser beam propagating in the first direction; and
        at least one optical isolator configured to suppress laser radiation propagating in a second direction opposite to the first direction,
    wherein the optical isolator comprises:
        at least one Faraday rotator; and
        a first polarizer and a second polarizer, between which the Faraday rotator is arranged,
    wherein the Faraday rotator comprises:
        a disk-shaped magneto-optical solid-state medium;
        a magnet generator configured to generate a magnetic field in the magneto-optical solid-state medium;
        a heat sink with a support surface for the magneto-optical solid-state medium;
        a reflector mounted between the heat sink and the magneto-optical solid-state medium and configured to reflect a laser beam entering the magneto-optical solid-state medium in a first impingement region on a first side of the magneto-optical solid-state medium, the first side facing away from the support surface; and
        a deflector configured to deflect the laser beam emerging from the magneto-optical solid-state medium back to the first side of the magneto-optical solid-state medium,
        wherein the deflector is configured to deflect the laser beam back to a second impingement region that at least partly overlaps with the first impingement region on the first side of the magneto-optical solid-state medium.

2. The system of claim 1, further comprising:
    a vacuum chamber in which a target material is arrangeable; and
    a beam guiding device configured to guide the laser beam propagating in the first direction from the driver laser system to the target material.

3. The system of claim 1, wherein the deflector is configured to deflect the laser beam at least twice into the first impingement region on the first side of the magneto-optical solid-state medium, the second impingement region being identical to the first impingement region.

4. The system of claim 1, wherein the deflector comprises:
    a focusing device with a reflection surface configured to focus the laser beam onto the magneto-optical solid-state medium; and
    at least one deflection unit configured to deflect the laser beam between a plurality of reflection regions formed on the reflection surface, the plurality of reflection regions being arranged in different angular regions about a central axis of the reflection surface.

5. The system of claim 1, wherein the deflector comprises a plurality of reflective elements,
    wherein a respective mirror surface is formed on each of the plurality of reflective elements and configured to deflect the laser beam, and
    wherein the respective mirror surfaces of the plurality of reflective elements are each aligned such that the laser beam is deflected from a first respective mirror surface of a first reflective element to a second respective mirror surface of a second reflective element via the magneto-optical solid-state medium.

6. The system of claim 1, wherein the magneto-optical solid-state medium comprises at least one material selected from a group of materials comprising InAs and terbium gallium garnet.

7. The system of claim 1, wherein the reflector forms a reflective coating applied to a second side of the magneto-optical solid-state medium facing the support surface, the second side being opposite to the first side.

8. The system of claim 7, wherein the reflective coating comprises at least one material selected from a group of materials comprising ZnSe, ZnS, $ThF_4$, and $YbF_3$.

9. The system of claim 1, wherein an anti-reflection coating is applied to the first side of the magneto-optical solid-state medium facing away from the support surface.

10. The system of claim 1, wherein at least one heat-conducting layer is applied between the magneto-optical solid-state medium and the support surface of the heat sink.

11. The system of claim 10, wherein a material of the heat-conducting layer is selected from a group of materials comprising: synthetic diamond, YAG, silicon, germanium, sapphire, diamond-like carbon, and tetrahedral carbon.

12. The system of claim 1, wherein the heat sink has at least one cooling channel for passing through a cooling fluid.

13. The system of claim 1, wherein the support surface of the heat sink is curved as a concave surface or a convex surface.

14. The system of claim 1, wherein the second impingement region is identical to the first impingement region.

* * * * *